United States Patent
Abileah

(10) Patent No.: US 7,411,636 B2
(45) Date of Patent: Aug. 12, 2008

(54) STEREOSCOPIC LIQUID CRYSTAL DISPLAY (LCD) WITH POLARIZATION METHOD

(75) Inventor: Adiel Abileah, Portland, OR (US)

(73) Assignee: Fergason Patent Properties, LLC, Menlo Park, CA (US)

( * ) Notice: Subject to any disclaimer, the term of this patent is extended or adjusted under 35 U.S.C. 154(b) by 115 days.

(21) Appl. No.: 10/997,728

(22) Filed: Nov. 23, 2004

(65) Prior Publication Data

US 2006/0232719 A1    Oct. 19, 2006

(51) Int. Cl.
*G02F 1/1335* (2006.01)

(52) U.S. Cl. ............................................. 349/15; 349/8
(58) Field of Classification Search ................... 349/15, 349/8

See application file for complete search history.

(56) References Cited

U.S. PATENT DOCUMENTS

| | | | |
|---|---|---|---|
| 2,845,618 A | 7/1958 | Huffman | |
| 3,777,059 A | 12/1973 | Wilkey, Jr. | |
| 4,385,806 A | 5/1983 | Fergason | |
| 5,074,645 A | 12/1991 | Gold et al. | |
| 5,300,942 A | 4/1994 | Dolgoff | |
| 5,416,496 A | 5/1995 | Wood | |
| 5,421,589 A | 6/1995 | Monroe | |
| 5,453,859 A * | 9/1995 | Sannohe et al. | 349/9 |
| 5,598,282 A * | 1/1997 | DeGroof | 349/15 |
| 5,644,427 A | 7/1997 | Omori et al. | |
| D385,533 S | 10/1997 | Adams | |
| 5,717,422 A | 2/1998 | Fergason | |
| 5,777,665 A | 7/1998 | McNelley et al. | |
| 5,847,710 A | 12/1998 | Kroitor | |
| D415,124 S | 10/1999 | Rooyakkers et al. | |
| 5,976,017 A | 11/1999 | Omori et al. | |
| D428,864 S | 8/2000 | Rooyakkers et al. | |
| 6,130,784 A | 10/2000 | Takahashi | |
| 6,160,666 A | 12/2000 | Rallison et al. | |
| D438,206 S | 2/2001 | Joshi | |

(Continued)

FOREIGN PATENT DOCUMENTS

DE        195 34 750        3/1997

(Continued)

OTHER PUBLICATIONS

International Search Report and Written Opinion for International Application No. PCT/US2006/028263 dated Nov. 29, 2006.

(Continued)

*Primary Examiner*—Michael H Caley
(74) *Attorney, Agent, or Firm*—Renner, Otto, Boisselle & Sklar, LLP

(57) ABSTRACT

A display system for stereoscopic displaying of images includes a pair of wide viewing angle displays arranged at an angle to each other, each display providing respective images formed by plane polarized light. A beam combiner is located between the displays such that the beam combiner transmits light from one display and reflects light from the other display, whereby the transmitted and reflected light are provided via the beam combiner in substantially the same direction. One of the wide viewing angle displays has a substantially vertical polarization and the other of the wide viewing angle displays has a substantially horizontal polarization. The display system provides for stereoscopic display of high-resolution images with wide horizontal and vertical viewing angles.

53 Claims, 10 Drawing Sheets

U.S. PATENT DOCUMENTS

| | | | |
|---|---|---|---|
| 6,184,969 B1 | 2/2001 | Fergason | |
| D440,543 S | 4/2001 | Kodimer | |
| 6,212,068 B1 | 4/2001 | Rooyakkers et al. | |
| 6,271,924 B1 | 8/2001 | Ngoi et al. | |
| 6,335,773 B1* | 1/2002 | Kamei et al. | 349/96 |
| D455,427 S | 4/2002 | Vejbrink | |
| 6,400,394 B1 | 6/2002 | Kim et al. | |
| 6,449,090 B1 | 9/2002 | Omar et al. | |
| 6,522,310 B1 | 2/2003 | Kim | |
| 6,593,957 B1 | 7/2003 | Christie | |
| 6,611,241 B1* | 8/2003 | Firester et al. | 345/1.3 |
| 6,633,306 B1 | 10/2003 | März et al. | |
| 6,703,988 B1 | 3/2004 | Fergason | |
| D492,676 S | 7/2004 | Monson et al. | |
| 6,765,640 B1 | 7/2004 | Acosta et al. | |
| 6,831,711 B2* | 12/2004 | Choi et al. | 349/74 |
| 2001/0052956 A1* | 12/2001 | Lee et al. | 349/123 |
| 2002/0085284 A1* | 7/2002 | Nakamura et al. | 359/601 |
| 2004/0114080 A1 | 6/2004 | Miyachi | |
| 2004/0212763 A1* | 10/2004 | Tsuchiya | 349/114 |
| 2004/0223218 A1* | 11/2004 | Putilin et al. | 359/462 |
| 2005/0078253 A1* | 4/2005 | Kim et al. | 349/139 |
| 2005/0128400 A1* | 6/2005 | Wang et al. | 349/130 |

FOREIGN PATENT DOCUMENTS

| | | |
|---|---|---|
| EP | 0 505 998 | 9/1992 |
| EP | 1 037 093 | 9/2000 |
| ES | 2 024 269 | 2/1992 |
| JP | 63-74027 | 4/1988 |
| JP | 5-168046 | 7/1993 |
| JP | 05-168046 | 7/1993 |
| JP | 06 160834 | 6/1994 |

OTHER PUBLICATIONS

International Search Report and Written Opinion for International Application No. PCT/US2005/042306 dated Jun. 27, 2006.
Pat Abst Jp v017 n575 E1449, JP.
Partial International Search Report for International Application No. PCT/US2005/042499, dated Apr. 11, 2006.

* cited by examiner

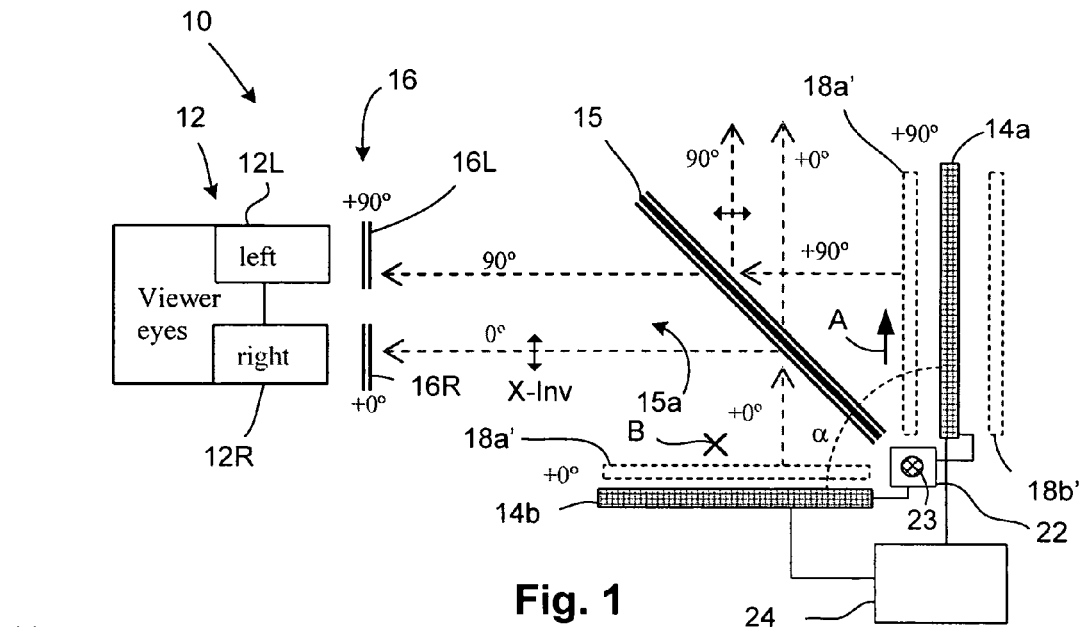
Fig. 1
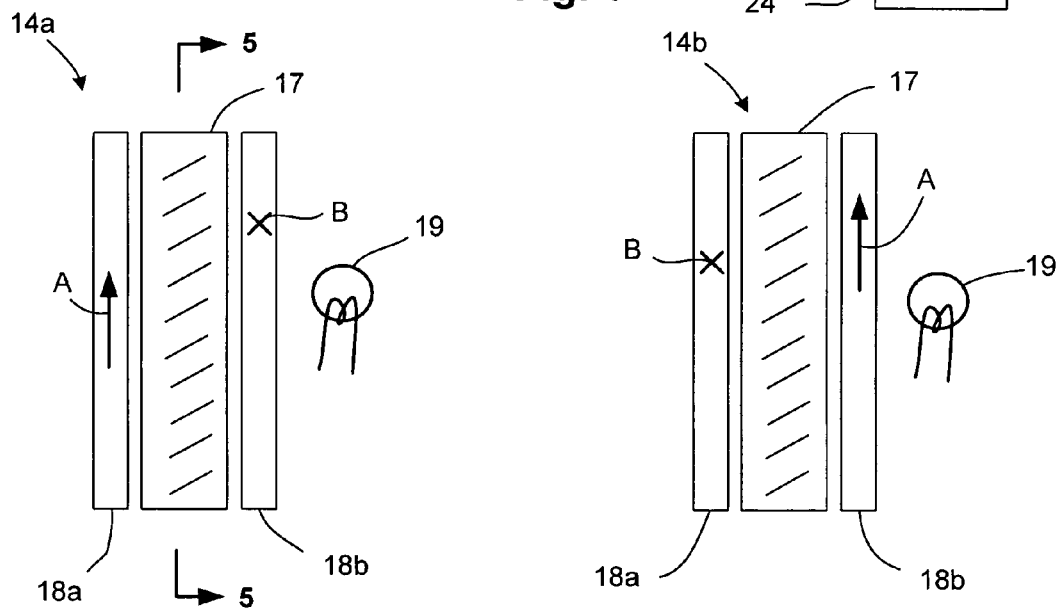
Fig. 3
Fig. 4
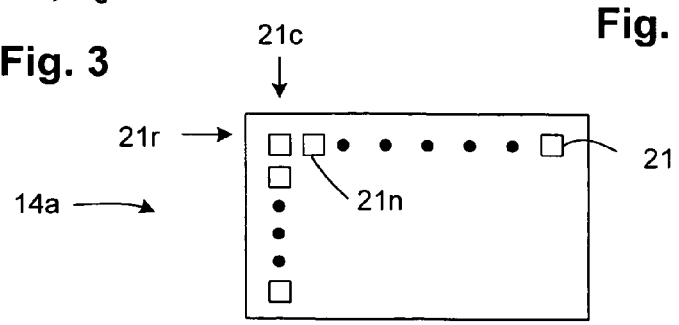
Fig. 5

STEREOSCOPIC LIQUID CRYSTAL DISPLAY (LCD) WITH POLARIZATION METHOD

TECHNICAL FIELD

The invention relates generally to an apparatus and method for displaying three-dimensional images.

BACKGROUND

Some three-dimensional displays are based either on imaging techniques that give rise to an apparent stereo effect (also referred to as a stereoscopic effect and/or a three-dimensional or 3D effect) by perspective views, or on two images being presented that are separated such that the right eye and the left eye of a viewer, e.g., a person, see respective images of, for example, a stereo pair of images, which are distinguished or differentiated, e.g., by polarization characteristics of light or by some other means. An example of a stereo pair of images (also referred to as a stereo image pair) may include two similar images or views that represent what a viewer may see via respective left and right eyes while looking at a scene. Since the eyes are spaced apart, they see the scene from different angles and thereby provide depth, 3D, stereo, etc., information to the viewer.

An exemplary three-dimensional display system is disclosed in U.S. Pat. No. 6,703,988 to Fergason, the entire disclosure of which is hereby incorporated by reference.

Liquid crystal display (LCD) devices continue to advance in performance, such as increased resolution and increased viewing angle, and commercial availability.

SUMMARY

An aspect of the invention relates to a display system including a pair of wide viewing angle displays arranged at an angle to each other, each display providing respective images formed by plane polarized light; a beam combiner located between the displays such that the beam combiner transmits light from one display and reflects light from the other display, whereby the transmitted and reflected light are provided via the beam combiner in substantially the same direction; and wherein one of the wide viewing angle displays has a substantially vertical polarization and the other of the wide viewing angle displays has a substantially horizontal polarization.

Another aspect of the invention relates to a display system including a pair of active matrix liquid crystal displays (AMLCDs) arranged at an angle to each other, the AMLCDs having the same relative orientation and producing images having orthogonal polarization; and a beam combiner disposed between the AMLCDs such that the beam combiner transmits light from one AMLCD and reflects light from the other AMLCD.

Another aspect of the invention relates to a method of displaying stereo images including simultaneously displaying a left eye image on a first wide viewing angle display and a right eye image on a second wide viewing angle display such that the left eye and right eye images have optical polarization in orthogonal directions; using a beam combiner so positioned relative to the two wide viewing angle displays that one can be viewed directly through the beam combiner and the other can be viewed by reflected light from the beam combiner; and combining the left eye and right eye images in a common light path such that the optical polarization of the left eye image portion and the right eye image portion are different in such common light path such that the image portions can be separated based on optical polarization.

Another aspect of the invention relate to a method of providing a high-resolution wide viewing angle stereoscopic display system that includes a pair of high-resolution wide viewing angle displays, each of the high-resolution wide viewing angle displays having a relatively vertically oriented plane polarizer and a relatively horizontally oriented rear polarizer, one of the polarizers being at the front and the other of the polarizers being at the rear of the respective high-resolution wide viewing angle displays, the method including re-orienting the front and rear polarizers on one of the high-resolution wide viewing angle displays by 90 degrees; and arranging the high-resolution wide viewing angle displays at an angle relative to one another, and positioning a beam combiner between the high-resolution wide viewing angle displays such that the beam combiner transmits light from one of the high-resolution wide viewing angle displays and reflects light from the other high-resolution wide viewing angle display in substantially the same direction such that light from the respective displays is orthogonally polarized.

Another aspect of the invention relates to a method of making a display system including selecting a first liquid crystal display (LCD) having a pair of plane polarizers and optical material between the polarizers selectively operable to change the polarization direction of light; selecting a second LCD that is substantially the same as the first LCD; and repositioning the polarizers of the second LCD relative to the optical material thereof to be substantially orthogonal to the corresponding polarizers of the first LCD.

Another aspect of the invention relates to a method of preparing a liquid crystal display that has a liquid crystal cell and a pair of plane polarizers attached to opposite sides of the liquid crystal cell, the method including removing the pair of plane polarizers from the liquid crystal cell and re-attaching the pair of plane polarizers to the opposite sides of the liquid crystal cell at 90 degrees relative to their original orientation.

Another aspect of the invention relates to a display system including a pair of liquid crystal cells, the liquid crystal cells having liquid crystal alignment characteristics that provide a wide viewing angle; a beam combiner that combines images from the pair of liquid crystal cells; and each of the liquid crystal cells including a pair of plane polarizers, wherein the pair of plane polarizers corresponding to each liquid crystal cell is oriented such that the polarization direction of plane polarized light from one liquid crystal cell is parallel to the plane of the beam combiner and the polarization direction of plane polarized light from the other liquid crystal cell is relatively orthogonal to that of such one liquid crystal cell.

Another aspect of the invention relates to a display system including a pair of wide viewing angle displays arranged at an angle to each other, each display providing respective images formed by plane polarized light; a beam combiner located between the displays such that the beam combiner transmits light from one display and reflects light from the other display, whereby the transmitted and reflected light are provided via the beam combiner in substantially the same direction; and wherein light incident on the beam combiner from one of the wide viewing angle displays has substantially vertical polarization and light incident on the beam combiner from the other of the wide viewing angle displays has substantially horizontal polarization.

To the accomplishment of the foregoing and related ends, the invention, then, comprises the features hereinafter fully described in the specification and particularly pointed out in the claims, the following description and the annexed drawings setting forth in detail certain illustrative embodiments of the invention, these being indicative, however, of but several of the various ways in which the principles of the invention may be suitably employed.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

Although the invention is shown and described with respect to one or more embodiments, it is to be understood that equivalents and modifications will occur to others skilled in the art upon the reading and understanding of the specification. The present invention includes all such equivalents and modifications, and is limited only by the scope of the claims.

Also, although various features are described and are illustrated in respective drawings/embodiments, it will be appreciated that features of a given drawing or embodiment may be used in one or more other drawings or embodiments of the invention.

BRIEF DESCRIPTION OF THE DRAWINGS

These and further features of the present invention will be apparent with reference to the following description and drawings, which are somewhat schematic and are not necessarily to scale, and wherein:

FIG. 1 is a schematic illustration of a three-dimensional display system in accordance with an exemplary embodiment of the invention;

FIGS. 3 and 4 are schematic elevation illustrations of two displays useful in the display systems of FIGS. 1 and 2;

FIG. 5 is a schematic plan view illustration of the display of FIG. 3 looking in the direction of the lines 5-5 thereof;

DESCRIPTION

Figure 2:
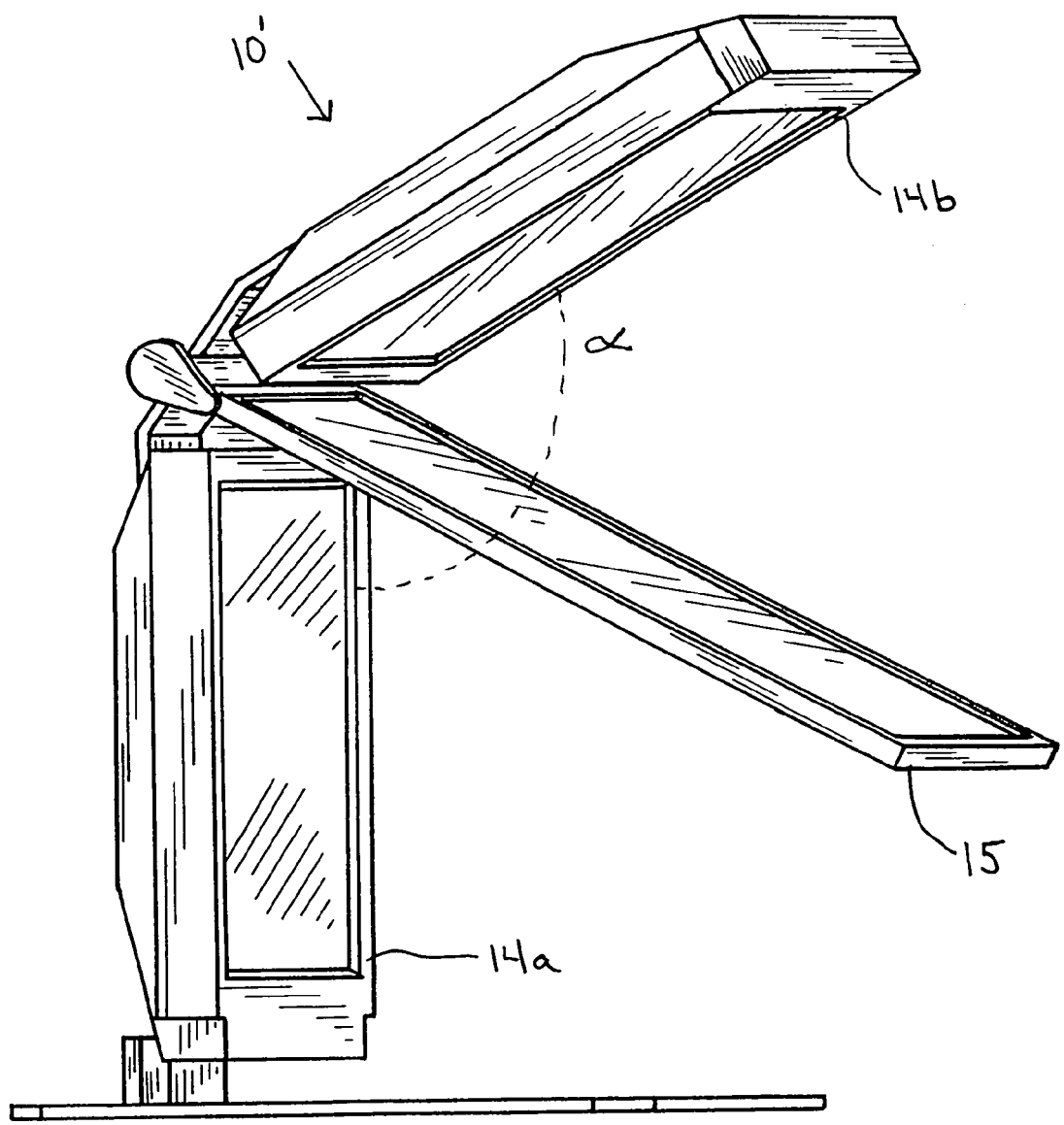
FIG. 2 is a schematic illustration of an above and below arrangement of displays in a three-dimensional display system in accordance with the invention.

Referring to the drawings wherein like reference numerals designate like parts in the several figures, and initially to FIG. 1, a display system for showing high-resolution and three-dimensional images is schematically illustrated at 10. As is illustrated, for example, the display system 10 is being viewed by an individual 12 as a viewer of images provided or shown by the display system 10.

The display system 10 includes a pair of wide viewing angle displays 14a, 14b, which are arranged at an angle relative to each other, and a beam combiner 15 (also referred to as a beam splitter), which is between the displays such that the beam combiner transmits light from one display and reflects light from the other display. The light from the displays 14a, 14b, may represent images that are provided by the beam combiner 15 along a common light path 15a to the viewer 12, who may view the respective images.

In an exemplary embodiment of the display system 10, the displays 14a, 14b and the beam combiner 15 may be generally planar devices; the displays and beam combiner are oriented relative to each other such that the displays are at an angle relative to each other and the beam splitter is at the bisectrix of that angle so as to provide the transmitted and reflected images from the respective displays along the light path 15a to the viewer 12. Other styles of displays and beam combiners also may be used within the spirit and scope of the present invention. The view in FIG. 1 in a sense is looking down at the top of the viewer 12 and display system 10, and the displays 14a, 14b are in vertical planes, the top edge of each display being seen in FIG. 1. If desired, the displays 14a, 14b may be arranged in another geometry, e.g., an above and below arrangement, as is illustrated schematically in a display system 10' in FIG. 2. For example, referring to FIG. 2, a first display 14a is in a substantially vertical plane and a second display 14b is in a generally horizontal or angled plane above the first display, the angle alpha ($\alpha$) being about 120 degrees (120°), as shown in the non-limiting example of FIG. 2. As is discussed below, other configurations and angles also may be used.

Light provided to the beam combiner 15 is plane polarized (also sometimes referred to as linearly polarized, etc.). The polarization direction (also referred to as the direction of the plane of polarization) of the light, which represents an image from one of the displays, as it is incident on the beam combiner, is parallel to the plane of the beam combiner 15; and the polarization direction of the light, which represents the image from the other display, as it is incident on the beam combiner, is relatively orthogonal (perpendicular) to that from such one display. For example, the polarization direction of light that is reflected by the beam combiner 15 to the viewer 12 may be in the plane of the beam combiner. Alternatively, the polarization direction of light that is transmitted through the beam combiner 15 to the viewer 12 may be in the plane of the beam combiner 15.

In the display system 10 of FIG. 1 an arrow A represents the polarization direction of light representing an image, for example, from the display 14a that is incident on the beam combiner 15. The tail of an arrow B, which is represented by the letter "X", represents the polarization direction of light representing an image from the display 14b that is incident on the beam combiner 15. The polarization directions A, B are relatively orthogonal (perpendicular), e.g., relative to the drawing one pointing in a vertical direction and one pointing into the plane of the paper (sometimes referred to as a horizontal direction). For convenience of description, such directions A and B may be referred to or considered as polarization directions (direction of the plane of plane polarized light) that are, respectively, ninety degrees (90°), e.g., vertical, and zero degrees (0°), e.g., horizontal.

The beam combiner 15, for example, may be arranged such that images from both displays 14a, 14b, e.g., those images transmitted and reflected by the beam combiner, respectively, to the light path 15a may be viewed by the left and right eyes 12L, 12R of a viewer 12. The images provided by the displays 14a, 14b may be, respectively, left and right eye images of a stereo pair, which can be discriminated, e.g., by a discriminating device 16, such as, for example, eyeglasses, goggles, etc., that includes respective plane polarizers 16R, 16L, polarized lenses, etc. The polarization directions of the plane polarizers 16R, 16L are orthogonal; one transmits light from one display 14a, 14b and blocks light from the other display; and vice versa for the other of the polarizers 16R, 16L. By viewing the stereo pair images via a discriminating device 16, such that one eye sees images from one display and the other eye sees images from the other display, the viewer 12 may see an image that is perceived as a three-dimensional (stereoscopic or 3D) image. Accordingly, a three-dimensional or stereoscopic display is obtained by the display system 10.

As is illustrated schematically in FIGS. 3 and 4, each display 14a, 14b may include a liquid crystal cell 17 and a pair of polarizers 18a, 18b. Optionally, one or more retardation films (not shown) may be included between the liquid crystal cell and one or both of the polarizers. A light source 19 provides incident light. The polarizers 18a, 18b may be plane polarizers and, for example, they may be arranged such that the polarization directions thereof (e.g., the polarization direction of the plane polarized light that is transmitted by the given polarizer) are orthogonal, e.g., crossed polarizers, as is represented in a conventional matter by an arrow and a letter "X" (representing the tail of an arrow) in the drawing. The liquid crystal cell 17, or respective parts of it, for example, in conjunction with the polarizers 18a, 18b may be operated in such a manner as to affect selectively optical polarization of light and, thus, selectively to control light transmission by the display to form images, e.g., as in a twisted nematic (TN) liquid crystal display (LCD), active matrix liquid crystal displays (AMLCDs), such as, for example, vertical alignment LCDs and in-plane switching LCDs, and in at least some other LCDs.

In an embodiment of the invention, each of the displays 14a, 14b is the same except that the polarization directions of light provided from the displays to the beam combiner 15 are relatively orthogonal (mutually perpendicular). For example, each display may have the same viewing angle characteristics, arrangement of pixels (also referred to as picture elements or the like), resolution, color characteristics, gamma, and/or driving or operating characteristics.

In an embodiment of the invention, two same displays may be used for the displays 14a, 14b and the polarizers 18a, 18b, for example, associated with one display may be rotated by ninety degrees (90°) relative to the liquid crystal cell 17 thereof to achieve the orthogonal relationship of the polarized light provided by the respective same displays to the beam combiner 15, as is described herein.

In an embodiment of the invention, the displays 14a, 14b have a wide viewing angle characteristic. For example, the displays provide good contrast for images that are viewed at relatively large angles measured from a normal, e.g., perpendicular, to the face or plane of the display. If the contrast ratio of a display is too small, an image may appear washed out or information that is to be presented by the image may be lost or relatively non-apparent. As one example of a wide viewing angle display, a contrast ratio on the order of at least about 10 to 1 may be obtained for viewing angles as large as eighty degrees (80°) from a normal (perpendicular line) to the display; the contrast ratio may be greater as the viewing angle approaches the normal, and, accordingly, the wide viewing angle or viewing range for such display would be about 160 degrees (160°). In another example, a contrast ratio of at least about 10 to 1 may be provided by an LCD at a viewing angle of 85 degrees (85°), thus providing a wide viewing angle characteristic or viewing range of 170 degrees (170°).

As an example, the displays 14a, 14b may be active matrix liquid crystal displays (AMLCD) that have wide viewing angle characteristics. Several examples of AMLCDs that may be used in the invention include liquid crystal cells that are known or referred to as vertically aligned nematic (VAN) LCDs, in-plane switching (IPS) LCDs, multi-domain vertical alignment (MVA) LCDs, axial symmetric vertical alignment (ASV) LCDs, (also referred to as advanced super view (ASV) LCDs), patterned vertical alignment (PVA) LCDs, Super-PVA (S-PVA) LCDs, and the like. Other exemplary display types may include optical controlled birefringence (OCB) displays and so-called "PI cells." It is to be appreciated that other display devices, which currently exist or may come to exist in the future, that have high resolution, have wide horizontal and vertical viewing angle characteristics, and maintain acceptable contrast ratio when the polarizers are rotated can be employed without departing from the scope of the present invention.

As is illustrated in FIGS. 3 and 4, exemplary AMLCDs 14a, 14b include a liquid crystal cell 17 and a pair of plane polarizers 18a, 18b. The display 14b of FIGS. 1 and 4 may be similar to the display 14a of FIGS. 1 and 3 except that the orientation of the polarizers 18a, 18b to the liquid crystal cell 17 of the display 14b are rotated ninety degrees (90°) relative to the relation of the polarizers 18a, 18b to the liquid crystal cell 17 of the display 14a. The liquid crystal cells 17 of FIGS. 3 and 4 provide the wide viewing angle characteristic for the displays 14a, 14b and the respective front and back (sometimes referred to as rear) polarizers 18a, 18b, respectively, provide for polarization of light that is supplied to the liquid crystal cells, e.g., from respective light sources 19, and light that is provided as an output from the respective liquid crystal cells and, thus, from the respective liquid crystal displays 14a, 14b.

In an exemplary embodiment of the invention, the liquid crystal cells 17 of the displays 14a, 14b are the same, e.g., they are the same type. Being the same type, the liquid crystal cells may have one or more of the same arrangement of pixels, same alignment of liquid crystal material, are driven and operate in substantially the same way, etc. However, the arrangement of the polarizers with respect to the liquid crystal cell of the display 14b is such that the polarization direction of light provided by the front or output polarizer 18a representing an image from the display 14b to the beam combiner 15 is orthogonal to the polarization direction of the light representing an image from the display 14a that is incident on the beam combiner 15. This arrangement of polarizers with respect to the liquid crystal cell 17 of the display 14b allows the polarization direction 20b to be orthogonal to the polarization direction 20a, as was described above.

To obtain the same or substantially the same orientations of the liquid crystal cells 17 of the displays 14a, 14b relative to each other and relative to the beam combiner 15, while providing for the orthogonal polarization directions A, B relationship for light incident on the beam combiner 15, the polarizers associated with the liquid crystal cell of one of the displays may be rotated ninety degrees (90°) relative to the orientation of the polarizers with respect to the liquid crystal cell of the other display. In the illustrated embodiment of FIGS. 1 and 3, the polarizers 18a, 18b of the display 14a are oriented such that the front or output polarizer 18a provides light having a vertical polarization direction A relative to the illustration of the drawing figures. As is illustrated in FIGS. 1, 2 and 4, the polarization direction B for the output polarizer 18a of the display 14b is horizontal, e.g., crossed to the polarization direction A. Directions that are described or are mentioned herein are relative and are provided for convenience of presenting the description of the invention. The directions up, down, left, right, over, under, etc., for example, may be altered as desired while still maintaining the described relationships of the parts of the invention to obtain operation of the display system 10.

In the illustrations of FIGS. 3 and 4, the liquid crystal cells 17 for displays 14a, 14b, respectively, are shown in a vertical plane, e.g., in the same orientation. However, as is seen in the illustration of FIG. 4 the pair of polarizers 18a, 18b associated with the liquid crystal cell of the display 14b relative to the liquid crystal cell are shifted or rotated ninety degrees (90°) in relation to the polarizers 18a, 18b to the liquid crystal cell 17 of the display 14a. Therefore, the polarization direction of plane polarized light provided as outputs from the respective output or front polarizers 18a of the displays 14a, 14b are shown by the orthogonal relationship of the directional arrow 20a and arrow tail 20b, respectively, which are the same relative directions that are represented at A, B in FIG. 1.

FIG. 5 is a schematic cross-sectional plan view representation of an exemplary AMLCD 14a looking generally in the direction of arrows 5-5 of FIG. 3. The illustration of FIG. 5 may represent an exemplary configuration for each of the displays 14a, 14b. The display 14a has a number of rows 21r and columns 21c of pixels 21 (also sometimes referred to as picture elements or the like) that may be operated to provide or to present an image on the display. The number of pixels in each row may be the same or different, and the number of pixels in each column may be the same or different. The number of pixels in the rows may be the same as or different from the number of pixels in the columns. In an exemplary embodiment of the invention, the liquid crystal cells of the displays 14a, 14b are oriented relative to the beam combiner 15 such that the images from the two displays are generally superimposed and travel along the light path 15a to the viewer 12. As viewed via the beam combiner 15, the arrangement of pixels of the respective displays are such that the pixels that form an image by the display 14a that is transmitted through the beam combiner 15 generally are aligned with or in a sense superimposed relative to the pixels that form the image from the display 14b that is reflected by the beam combiner 15. For example, looking at FIG. 5 a pixel 21n or a group of pixels forming a part of the transmitted image from the display 14a through the beam combiner 15 and the corresponding pixel 21n or group of pixels of the reflected image from the display 14b reflected by the beam combiner 15 may be relatively accurately superimposed. Stated differently, for example, the displays 14a, 14b may have approximately the same width-to-height aspect ratio; and, as viewed by the beam combiner 15, the respective widths and respective heights of the two displays may be substantially congruent.

If the displays 14a, 14b are the same or are substantially the same, e.g., the arrangement of pixels is the same or substantially the same and the method of driving or operating them is the same or is substantially the same, then coordinating the respective images provided by the displays can be facilitated and also can be relatively optimized. Such coordinating and optimizing tends to permit aligning pixels of one display, and, therefore, images provided by that display, with pixels of the other display and, therefore, images provided by that other display. The two images can be presented with the same or substantially the same resolution, and the colors, brightness, gamma, and other characteristics of the two displays 14a, 14b may be balanced, coordinated, etc. with relative facility. Using wide viewing angle displays 14a, 14b, such balanced, coordinated, etc., characteristics are achieved over a relatively wide range of angles at which a viewer 12 views the display system 10.

To use a pair of substantially same or similar displays 14a, 14b in the display system 10, the polarizers 18a, 18b for one of the displays may be removed from the liquid crystal cell 17 thereof, rotated ninety degrees (90°) and replaced on or with respect to the liquid crystal cell to provide the orthogonal orientation relative to the relationship of the polarizers to the liquid crystal cell of the other display as is described herein. As an example, consider that the display 14b shown in FIG. 4 originally may have been identical to the display 14a of FIG. 3. However, to make the display 14b for use in the system 10 the polarizers 18a, 18b may be removed from the liquid crystal cell 17 and installed with respect to the liquid crystal cell to obtain the orientation of the polarization directions for the display 14b, as is shown in FIG. 4 rather than as was original, e.g., see the illustration of FIG. 3.

In one embodiment, the polarizers 18a, 18b can be removed from the liquid crystal cell by mechanical means (e.g., pulling a corner of the polarizer and pulling the rest of the polarizer gradually, or using a thin wire to separate the adhesive). In another embodiment, the polarizers 18a, 18b can be removed by chemical means (e.g., using an appropriate chemical solvent) to dissolve the adhesive holding the polarizer to the liquid crystal cell (or to some intermediate surface). Optionally, heat can be used with the mechanical means or the chemical means to aid in the removal process. Once a polarizer is removed, the display can be cleaned, and a new polarizer can be rotated by 90 degrees relative to the orientation of the original polarizer (and the orientation of the polarizer of the corresponding display) and laminated to the liquid crystal cell (or some intermediate layer). The lamination process, which is well-known to skilled artisans, can include, for example, applying adhesive to the polarizer and/or the liquid crystal cell (or some intermediate layer) and applying pressure to the polarizer (e.g., with a roller) from one side to the other to smoothly and adhesively secure the polarizer to the liquid crystal cell.

The wide viewing angle characteristic of the liquid crystal display 14a, e.g., an AMLCD, still may be maintained identically or at least substantially identical even after having modified the orientation of the polarizers 18a, 18b relative to the liquid crystal cell 17 to obtain the orientation illustrated in FIG. 4, for example.

Alternatively, the displays 14a, 14b may be manufactured or made initially such that the liquid crystal cells 17 thereof are the same and the pair of polarizers of one display are applied to, attached, or positioned relative to the liquid crystal cell in a first relative orientation and the polarizers associated with the other liquid crystal cell for the other display are oriented orthogonally relative to those of the first-mentioned liquid crystal cell.

In a conventional AMLCD, for example, such as the display 14a, the polarizers 18a, 18b are attached to the liquid crystal cell 17. However, it is possible that the polarizers may be separate from, e.g., spaced apart from, the liquid crystal cell. Such separate polarizers 18a', 18b' are shown as examples in dash lines in FIG. 1 as substitutes for (or in addition to) polarizers attached to or otherwise associated with the liquid crystal cell of the displays 14a, 14b, respectively. When a separate polarizer or polarizers is/are used, as is represented by the dash lines mentioned, then it may be unnecessary to have polarizers also attached to the liquid crystal cell 17 of the respective display. In one embodiment, each display can include one or more retardation films (e.g., birefringence materials) between the liquid crystal cell and one or both polarizers to improve further the viewing angles of each display.

The displays 14a, 14b and the beam combiner 15 may be mounted, attached to, supported by, etc., a base or support structure that is generally represented at 22 in FIGS. 1 and 2. The displays 14a, 14b are oriented such that they are at an angle alpha ($\alpha$) with respect to each other and the planes thereof intersect along a line that is parallel to a linear axis 23 or is congruent with that axis. The angle alpha (α) may be smaller or larger than 90 degrees (90°) and may be as great as 180 degrees (180°) (or as near to 180 degrees as possible, while still providing a stereo effect through the beam combiner). An exemplary angular relation alpha (α) between the displays 14a, 14b may be on order of about 120 degrees (120°). The beam combiner 15 is planar or generally planar and is oriented such that the plane thereof is parallel to the axis 23, and the plane of the beam combiner, or the beam combiner itself, in effect, is at the bisectrix of the angle alpha (α). Thus, the angle between the beam combiner 15 and each of the displays 14a, 14b is one half (½) the angle alpha (α). Other angular relations possibly may be used, but in those instances compensation may be needed to achieve desired correlation between the images provided by the respective displays 14a, 14b. The structure, arrangement, mounting, etc., including the base 22, axis 23, and displays and beam combiner may be along the lines of those disclosed in the above-mentioned Fergason U.S. Pat. No. 6,703,988.

Although the invention is described using several exemplary types of AMLCDs, it will be appreciated that the invention may use other displays or image generators, provided the light output from the displays is polarized or is given polarization characteristics, e.g., by using one or more polarizers in the light path. For convenience of description and to avoid adding unnecessary verbiage, the image generators or displays are considered and described herein as AMLCDs, but it will be appreciated that other displays or image generators may be used.

If an electronic signal is received corresponding to the left and right images of a stereo pair, they can be displayed separately on the two liquid crystal displays 14a, 14b, sometimes referred to as display panels, as flat displays, flat screen displays, etc. They can be seen by the left and right eye 12L, 12R in the proper order by using a viewing device 16 that discriminates or distinguishes between the images of respective image pairs based on optical polarization. As is mentioned above, in an embodiment, the viewing device can include glasses, which are linearly polarized at right angles to each other and parallel to the image that is intended for the left or right eye.

The displays 14a, 14b provide linear or plane polarized light images to the beam combiner 15. In the illustrated embodiment, the image from the display 14a is viewed directly by the viewer 12 as light therefrom is transmitted directly through the beam combiner 15. In the illustrated embodiment, the image from the display 14a has a substantially vertical polarization (e.g., 90 degrees). The image from the display 14b is reflected by the beam combiner 15 toward the viewer 12. The direction of polarization of the linear polarized light provided from the display 14b is orthogonal (e.g., substantially horizontal or zero (0) degrees) to the polarization of the image from the display 14a. Therefore, light reaching the viewer 12 along the light path 15a includes two images, one from each display 14a, 14b, and the polarization directions of the linear or plane polarized light representing such images are crossed (e.g., at 90 degrees to each other, as was described above). The image from the display 14b is inverted in the horizontal direction due to a mirror image effect due to reflection by the beam combiner. In the illustration of FIG. 1, for example, such inversion is in a horizontal direction. In a different orientation of the displays of the display system 10, 10', the inversion may be in another direction, e.g., vertical. Such inversion is described more fully in U.S. Pat. No. 6,703,988 to Fergason, which is incorporated herein by reference in its entirety. As is discussed more fully below, the image data presented to the display 14b is inverted so that when it is reflected by the beam combiner 15, the reflected image (sometimes referred to as a virtual image) and the transmitted image from display 14a will be substantially superimposed in proper relation to allow viewing of a stereoscopic image by the viewer 12. In the illustrated embodiment, the viewer 12 uses linear (plane) polarizers 16L, 16R to view by his or her eyes the left and right eye images from the display system 10.

In one embodiment, the beam combiner 15 may be a glass sheet coated with multiple thin layer deposition coatings to transmit about 50 percent and reflect about 50 percent of incident light. Alternatively, the beam combiner may transmit more or less than 50 percent and reflect less or more than 50 percent. In the 50/50 embodiment, the transmission of the beam combiner may deviate from 50 percent, causing variations in brightness of the vertically polarized image. As is discussed below, these variations in brightness, while not having a fatal effect on the stereoscopic nature of the display system, can be compensated for using appropriate compensation means. In one embodiment, the beam combiner can be a polarizing beam splitter, which transmits one polarization axis, e.g., vertical, and reflects the orthogonal polarization axis, e.g., horizontal. Such a polarizing beam splitter can combine the images by reflection and transmission and provide the combined images to a common light path without changing the direction of the planes of polarization of the plane polarized light that is incident thereon. It will be appreciated that other types of beam combiners or beam splitters may be used without departing from the scope of the present invention.

It will be appreciated that the display system 10 of FIG. 1 has its parts arranged as was described above. For example, the displays 14a, 14b may be flat panel displays, which are arranged in a vertical, horizontal, or some other common direction, and the planes thereof are parallel with an imaginary linear axis 23, which extends in a direction perpendicular to the plane of the drawings relative to the illustration of FIG. 1. Also, the eyes of the viewer 12 are shown somewhat in perspective relative to the drawing, as they typically would be aligned in parallel with the axis 23 for optimum viewing, although some off-axis alignment may be acceptable. It is to be appreciated that the displays 14a, 14b can be arranged in a side-by-side arrangement, an over and under arrangement, as shown, for example, in FIG. 2, or some other suitable arrangement. In addition, it is to be appreciated that, in one embodiment the displays can be disposed at an angle of about 90 degrees (90°) to about 120 degrees (120°) relative to one another. In another embodiment, the displays can be disposed at an angle of about 60 degrees (60°) to about 140 degrees (140°) relative to one another. In still another embodiment the displays may be disposed at an angle up to 180 degrees (180°).

An image signal source 24 is illustrated. Such source may be a video source, a computer, a tape player, a CD player, a DVD player, etc. The image signal source may be remote and the image signal may be provided via a network or the like. The image signal source may provide signals to the displays 14a, 14b as a usual video circuit or video card provides signals to a display to create images for viewing. If desired, the image signal source 24 may include circuitry for reversing the direction of scanning or reversing the image being provided to a respective display to accommodate the inversion, as was mentioned above. In addition, the image signal source 24 may include circuitry for brightness variation compensation, as is described below in more detail.

Figure 6:
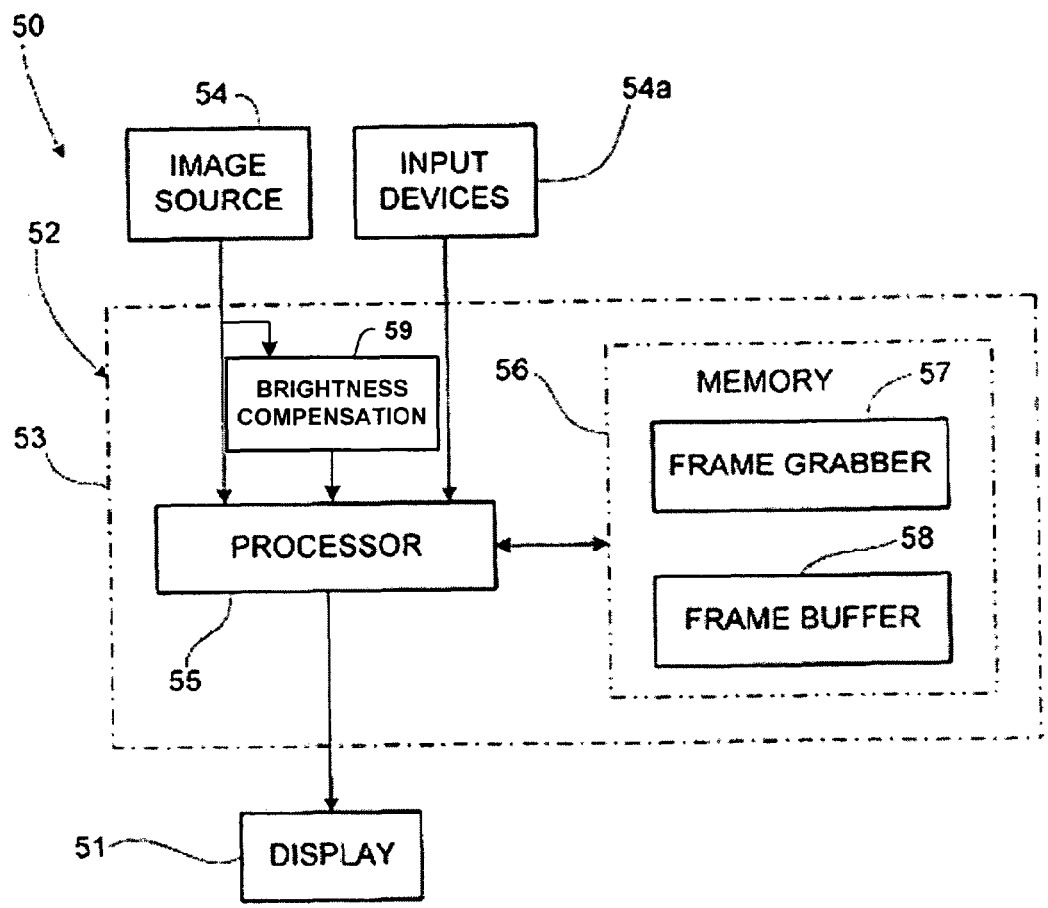
FIG. 6 is a schematic illustration of the display system of FIGS. 1 and 2 illustrating some operating system portions.

Turning to FIG. 6, a system for implementing the invention is illustrated at 50. The system 50 includes a display 51, such as the stereoscopic display system 10, 10' described above.

The system 50 also includes an image signal source 52 to provide appropriate signals to the display 51 to create images for viewing. The image signal source 52 includes, for example, a computer 53 and an image source 54. The image source 54 contains information or provides information to the computer 53, which supplies signals to the display 51 to create images for viewing. The image source may be, for example, a video source, a tape player, a CD player, a DVD player, a connection to a network to receive signals from a remote device, or a computer program, for example, which is operable on the computer 53 to develop images, such as for playing a game, for presenting medical images or architectural or mechanical drawings, and the like. Also associated with the computer 53 are input devices 54a, such as a keyboard, mouse, pointing device, or some other input signal providing mechanism to provide inputs to the computer to operate the same in a desired fashion.

The computer 53 includes a processor 55 and a memory 56. The processor may be a conventional microprocessor. The memory 56 may include non-volatile memory, such as ROM, CD-ROM, DVD, etc. and/or volatile memory, such as random access memory. Portions of the memory 56 may be designated as illustrated as a frame grabber 57 and as a frame buffer 58. The computer 53 may further include a brightness compensation processor 59. As discussed above, brightness variations may exist due to reflection and transmission characteristics of the beam combiner 15. These brightness variations may be due to interface effects at each layer of a multiple layer beam combiner 15 as well as variations in the transmission/reflection ratio of the beam combiner.

These variations in the images transmitted or reflected by the beam combiner, may manifest themselves as a slight difference in brightness seen by one eye. The variation in brightness may also depend on the viewing angle of the viewer. It is to be appreciated that the aforementioned brightness variations should not have an adverse effect on the stereoscopic performance of the display system. In one embodiment, the brightness compensation processor 59 may compensate for brightness variations at an average viewing angle. The average viewing angle can be computed in a conventional manner, as will be appreciated by one of ordinary skill in the art. In another embodiment, brightness can be set manually on each display, so that the brightness of the displays approximately match at normal viewing angles.

It will be appreciated that the several parts of the computer 53 described herein are exemplary. Other components, such as processors, memories, input/output devices, commonly used, currently available, and/or that may be developed in the future may be used to carry out various functions disclosed and described herein in accordance with the present invention and, thus, are equivalents of the illustrated and described exemplary embodiment.

Signals representing an image or characteristics of an image are provided the processor 55. Those signals may be supplied via the image source 54 (with or without brightness compensation 59) or, if desired, the image source 54 may be part of the memory 56, such as a CD-ROM, DVD or some other device included in or coupled to the computer 53 to provide the image information. In many display systems images are presented on a display, such as the display 51, as a series of sequentially presented frames. Signals representing a given frame, say from the image source 54, may be provided by the processor 55 to a frame grabber 57. The frame grabber may be a portion of the memory 56 selected to grab or to accumulate the information related to a given image frame. If the image signals include stereoscopic images, for example, a left image and a right image, sometimes referred to as a stereo pair, the frame grabber 57 may include two respective portions, one for grabbing and storing the left image and one for grabbing and storing the right image of a given frame or pair of frames for a given stereoscopic image. The frame buffer 58 is provided with the image signals, for example, on a bit mapped basis (or some other basis), and supplies those signals via the processor 55 to the display 51 for viewing by a viewer. The frame buffer 58 may include two portions, for example, one that stores the left image and one that stores the right image, and the processor directs the respective image information to the respective displays 14a, 14b (FIG. 1), for example.

Summarizing operation of the system 50, the processor 55 receives the image signals (along with any brightness compensation information) from an image source and supplies corresponding data representing a given frame or pair of frames to the image grabber 57. When the data representing a given image or pair of images (left and right images) in the frame grabber 57 has been completed, the processor stores the frame data in the frame buffer 58 and from the frame buffer 58 the processor either directly or via appropriate output circuitry, such as a VGA card or the like, to the display 51 for presentation to and viewing by a viewer 12. Various techniques may be used to obtain the image data and to provide it to the frame buffer 58. It may be unnecessary to use a frame grabber 57 in which case the image data may be supplied from some image source 54 via the processor 55 directly to the frame buffer, for example. Other devices may be used, too, to obtain image data, to process the data and to provide it to the display 51, the computer 53 being only one example of such a device and method.

As was mentioned above, the image provided by the display 14b (FIG. 1) is reflected by the beam combiner 15 and provided as part of the output to the viewer 12. Such reflected image in a sense is a virtual image because it is reversed due to the reflection by the beam combiner. Also, as was mentioned above, the image presented by the display 14b is inverted so that when it is reflected by the beam combiner 15, the reflected virtual image and the image from the display 14a, which is transmitted through the beam combiner 15 will be substantially superimposed in proper relation to allow viewing of a stereoscopic image by a viewer 12. Such inverting of the image presented by the display 14b may be accomplished in a number of different ways, several of which are described in U.S. Pat. No. 6,703,988 to Fergason, and others which may be equivalents also may be used.

The display system 10, 10' may include displays 14a, 14b (including integral polarizers 18a, 18b or separate polarizers 18a', 18b') having one or more of the following features: (1) a high-resolution output (which, in one embodiment, is greater than 1.5 mega-pixels); (2) wide horizontal and vertical viewing angles (which, in one embodiment is greater than about 160 degrees vertical and horizontal, and, in another embodiment, is greater than about 170 degrees vertical and horizontal); (3) no inversion of gray levels within the viewing angles; and (4) maintaining gray level separation within the viewing range.

Accordingly, exemplary embodiments of the invention described herein can be used in conjunction with applications where the gray levels (and possibly color combinations) need to be very precise. For example, such applications can include medical imaging and other diagnostic imaging, satellite photo displays, entertainment displays (such as video game displays) and any other topographic imaging applications or imaging applications where stereoscopic image display is desirable.

In one exemplary embodiment, wide horizontal and vertical viewing angles can be defined as viewing angles over which the display maintains a contrast ratio of at least 10:1. It is to be appreciated other metrics of acceptable or desirable viewing angles may be employed, as understood by those having ordinary skill in the art.

The displays 14a, 14b are polarized, e.g., provide light having polarization direction, and in an embodiment such polarization has a polarization direction that is parallel to the plane of the beam combiner 15 and for the other display the polarization direction is orthogonal to that of the first display. This display configuration can be created using wide viewing angle AMLCDs in which the high resolution and wide angle viewing characteristics (and the other aforementioned characteristics), in both the horizontal and vertical directions, are not lost when, on one of the displays, the front and back polarizers are removed and replaced or otherwise re-oriented at 90 degrees relative to the original orientation.

As is discussed above, in one embodiment, an AMLCD can have its original front polarizer (which is typically oriented vertically) and its original rear polarizer (which is typically oriented horizontally) removed and reinstalled on the AMLCD, e.g., laminated, with the respective front and rear polarizers at 90 degrees relative to their standard manufacturing. Alternatively, the displays can be manufactured with 90-degree-rotated front and rear polarizers. In one embodiment, each display can include a dual brightness enhancement film (DBEF), which matches the orientation of the rear polarizer and, optionally, is disposed behind the rear polarizer.

Turning now to FIGS. 7-12, plots of brightness (which is depicted in terms of gray scale) over viewing angles (which are depicted on the horizontal and vertical axes of the plots) and contrast ratio (CR) (which is depicted in terms of gray scale) over viewing angle are provided for exemplary displays, with and without polarizer rotation, in order to test the suitability of several exemplary displays for use in connection with the display system 10, 10' as described herein. The instrument used to make the measurements illustrated in FIGS. 7-12 is made by Eldim (France) type EZ-Contrast Model 160-R. Artisans will appreciate that this is a conoscopic imaging device, which records brightness in tilt angles from normal up to 80 degrees, and in azimuth angles 0 degrees to 360 degrees. The brightness units are calibrated to the eye response curve (photopic) and are in units of candelas per meter squared ($cd/m^2$). The contrast ratio (CR) is calculated by taking a white image of the screen and dividing the data by the brightness over angles of the black screen.

Figure 7:
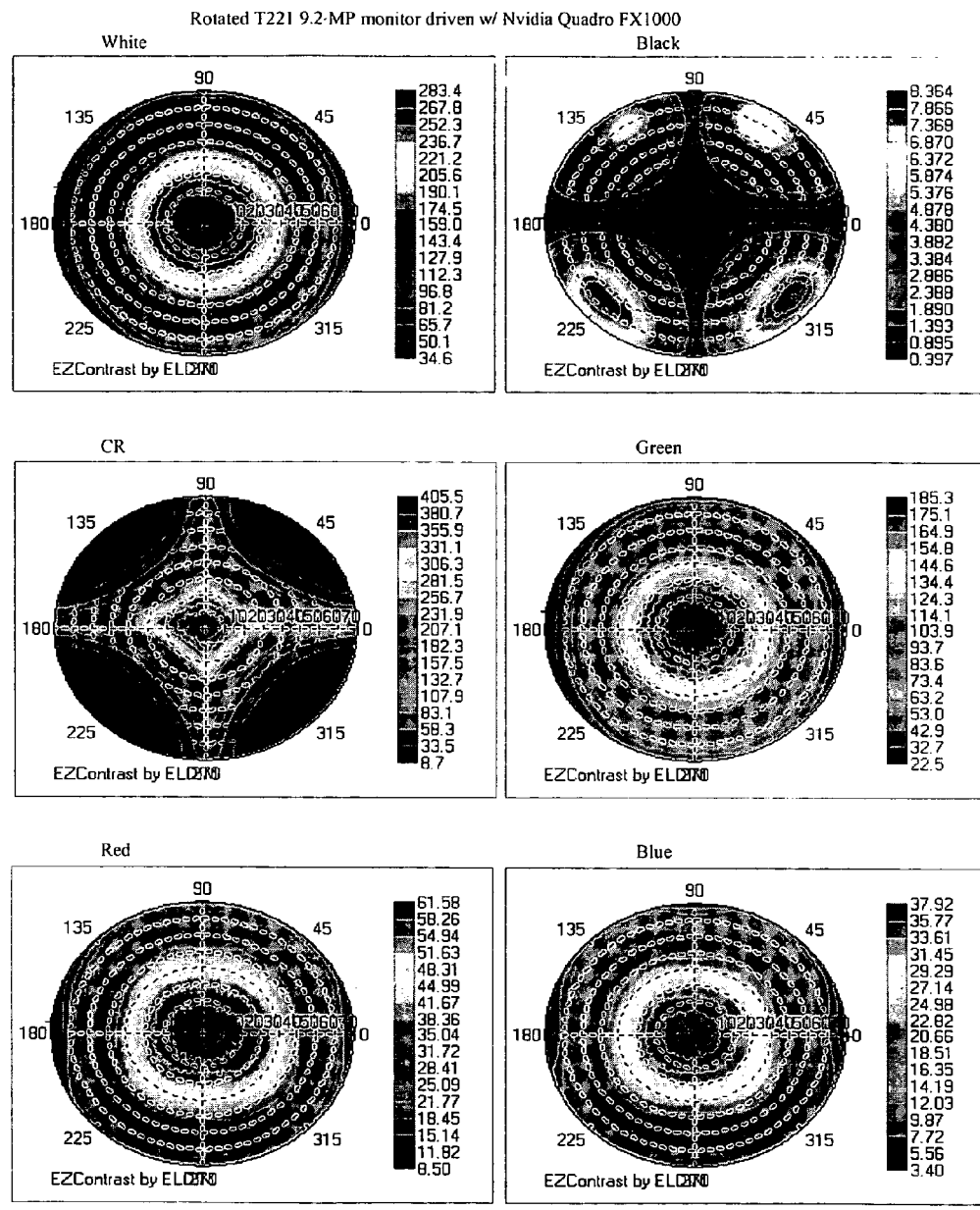
FIGS. 7-12 are brightness and contrast ratio plots for exemplary displays with and without polarizer rotation demonstrating the suitability of the displays for use in connection with exemplary embodiments of the present invention.
Figure 8:
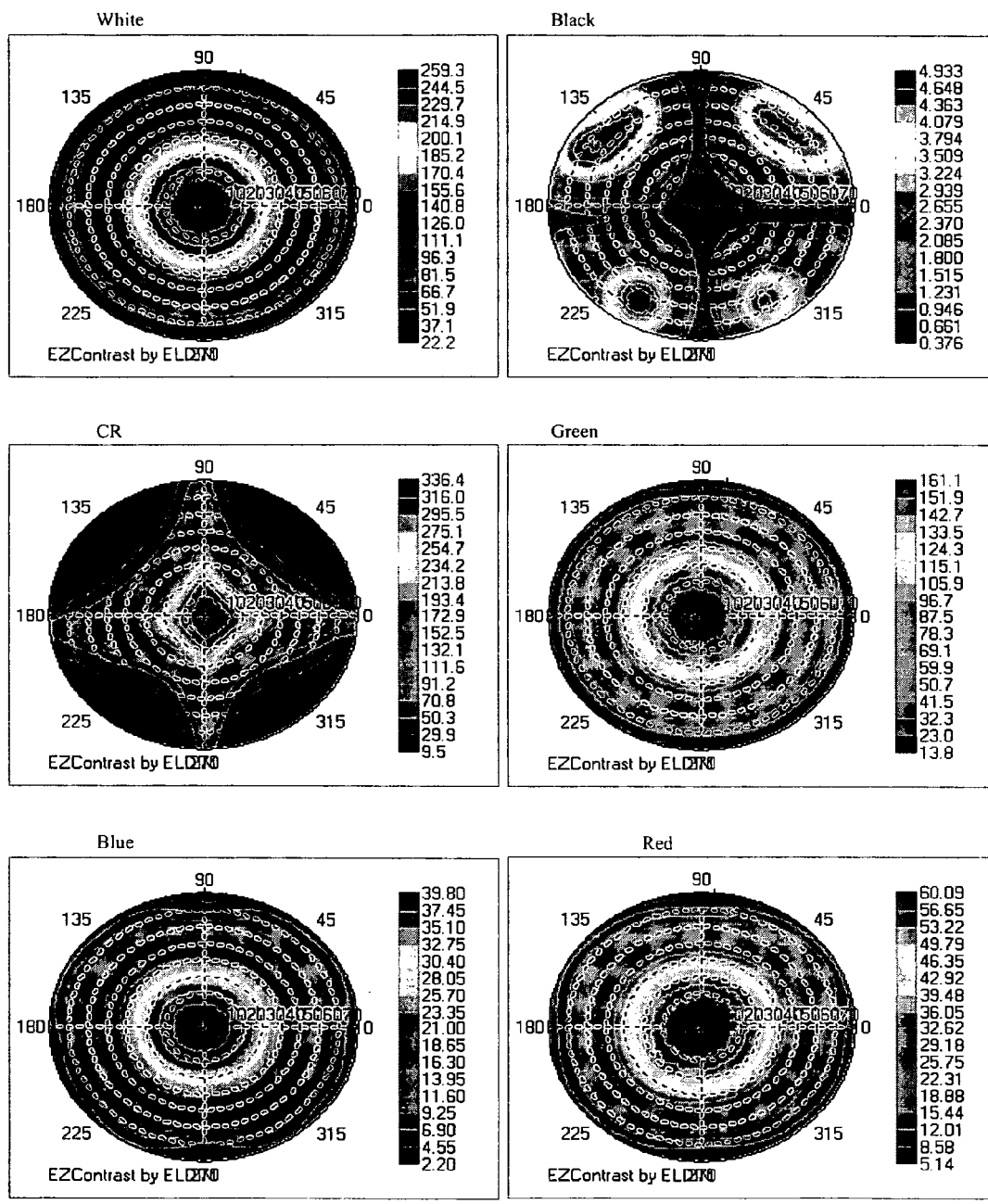
Figure 9:
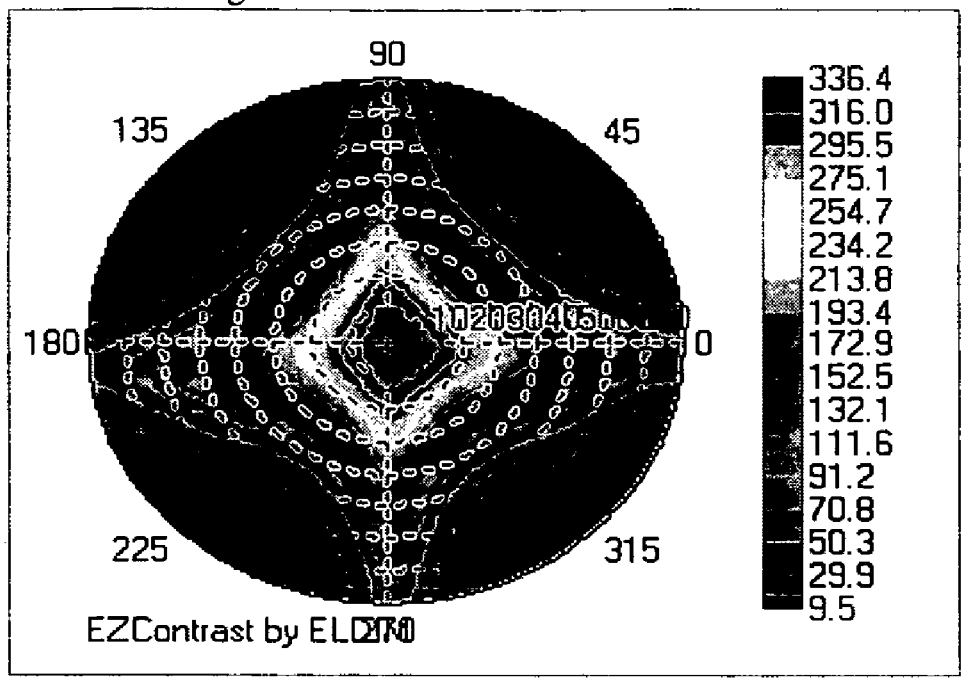
Figure 9:
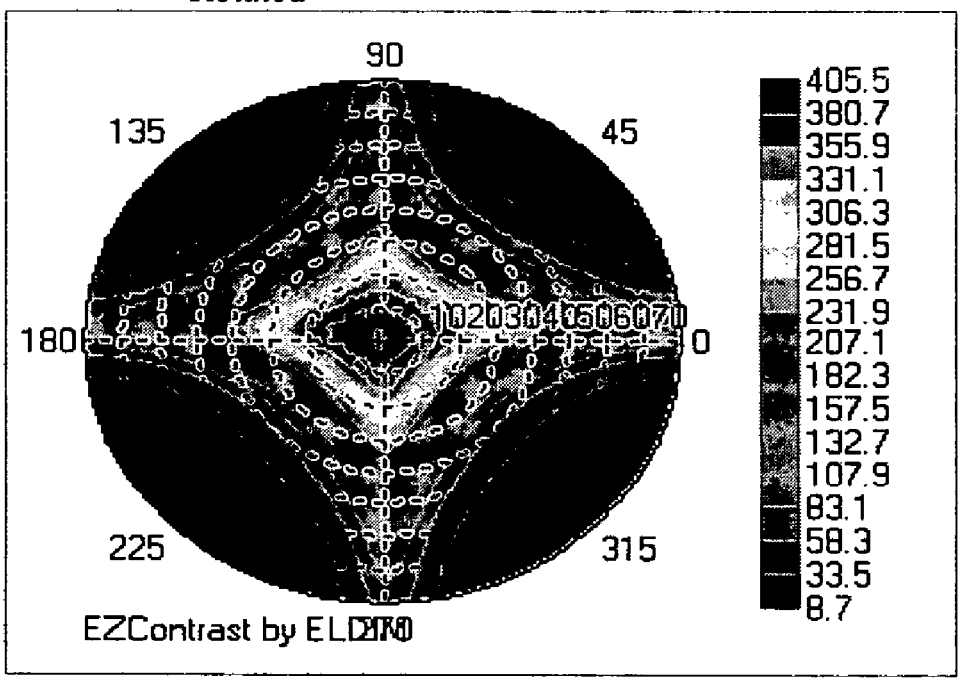

FIG. 7 illustrates brightness over angles measured for an IDTech display, Model T221, 9.2 MP (mega-pixels), with rotated polarizers (e.g., a horizontal front polarizer orientation) for white, red, green, blue and black screens. In addition, CR is also computed. For the sake of comparison, FIG. 8 shows corresponding plots for the same IDTech T221 display with the regular polarizer orientation (e.g., a vertical front polarizer orientation). Further, FIG. 9 shows a direct comparison of the CR plots for the IDTech T221 displays with standard polarizers (shown on top) and rotated polarizers (shown on bottom). As can be seen, the differences between the two plots in FIG. 9 are fairly marginal. For example, the two CR plots have approximately the same shape or contour (with and without polarizer rotation). In both cases, good viewing angles, both horizontally (left/right) and vertically (up/down) are maintained, indicating that this display type is most likely suitable for use in connection with exemplary embodiments of the display system described herein.

Figure 10:
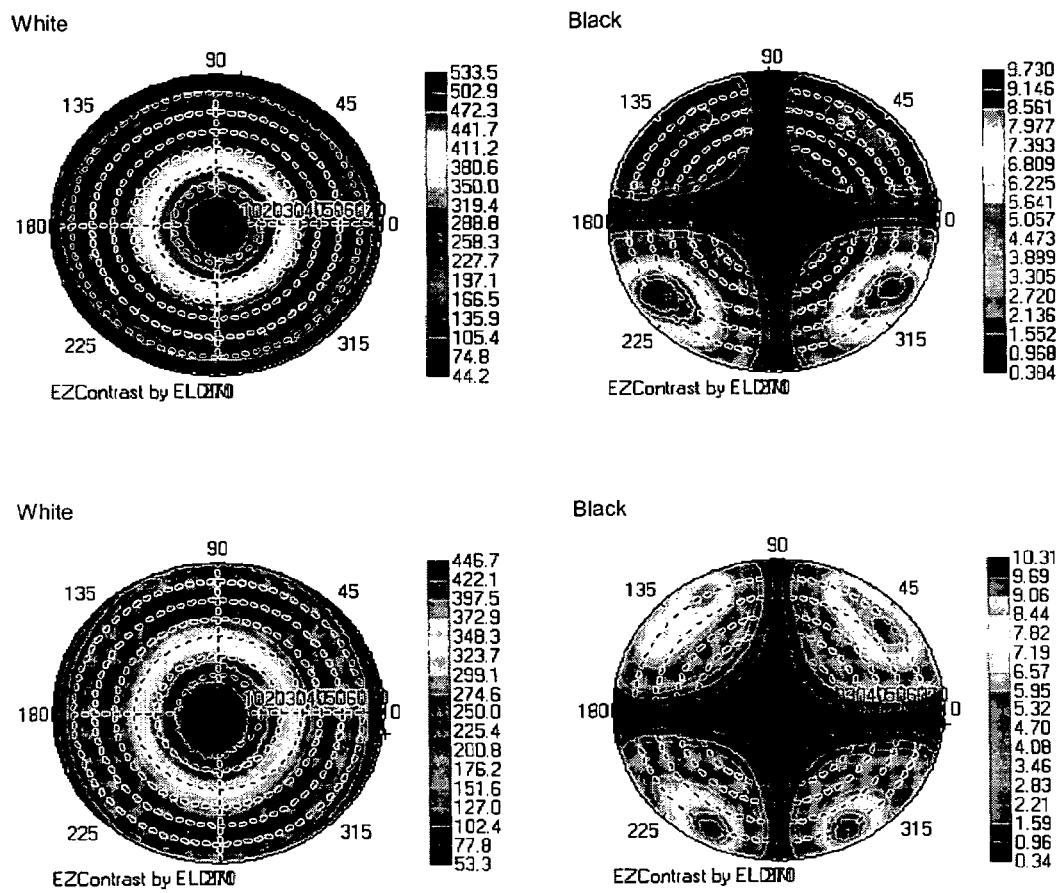
Figure 11:
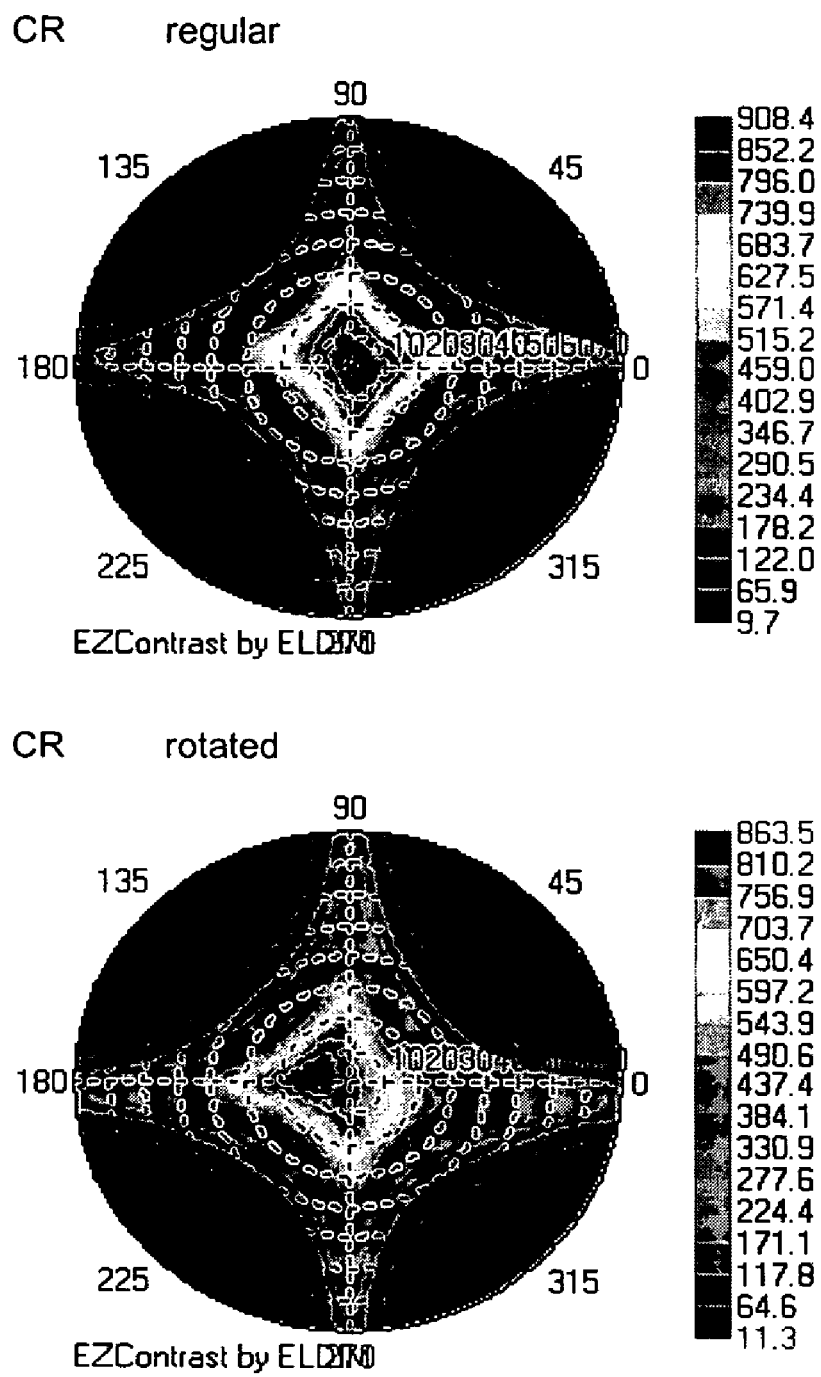

FIG. 10 shows brightness measurements over angles for an exemplary IDTech, Model C5i, 5 MP display with the polarizers in the regular position (shown in the top two plots) and polarizers in the rotated position (shown in the bottom two plots) with black and white screens. In addition, FIG. 11 shows respective CR plots over angles for the IDTech with the regular position polarizer plot on top and the rotated polarizer plot on the bottom. Again, rotating the polarizer for this display maintains the wide viewing angles, as can be seen in the plots, both horizontally and vertically. In addition, the two CR plots have approximately the same shape or contour.

Figure 12:
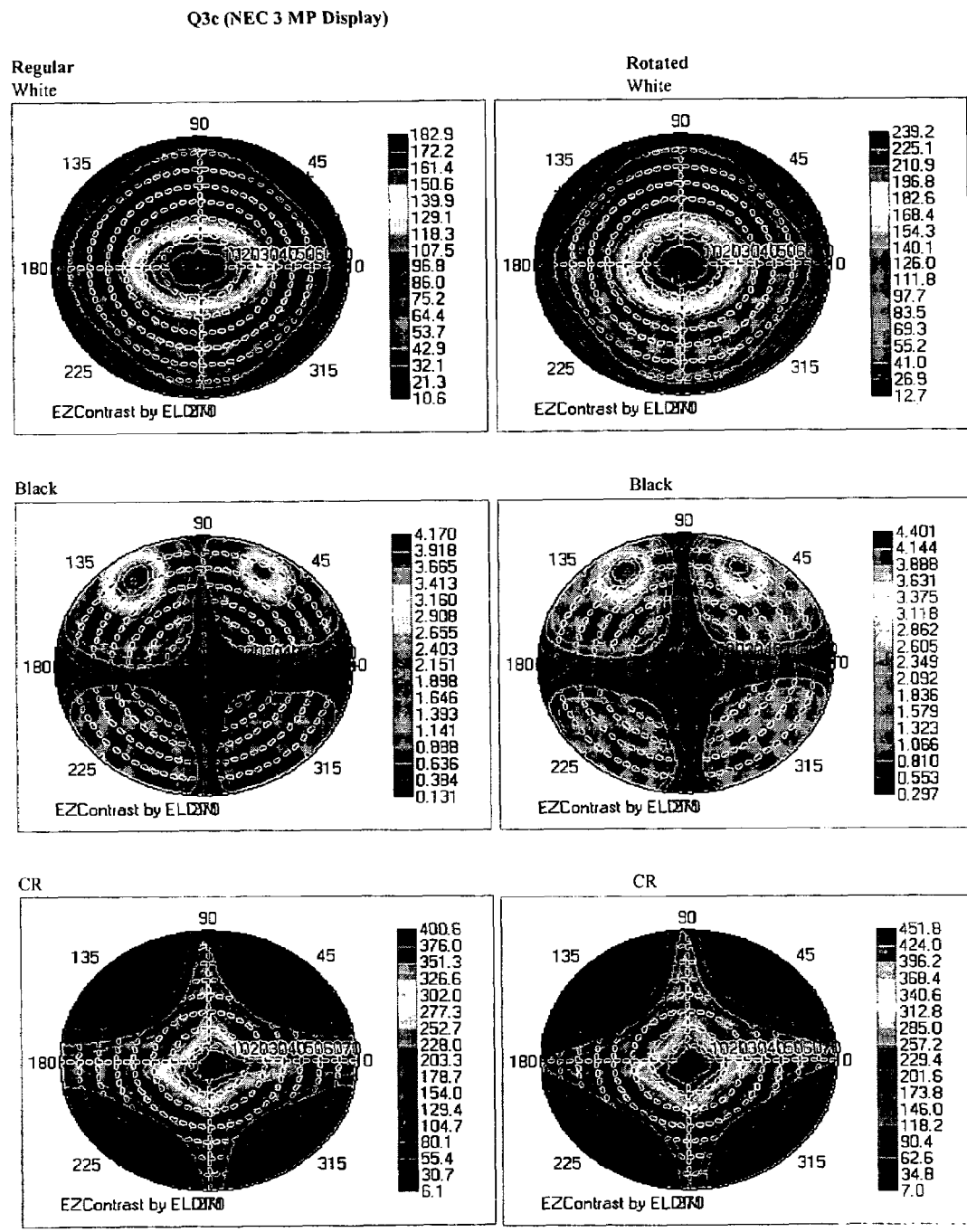

FIG. 12 shows brightness and CR plots for an exemplary NEC-Q3c, 3 MP color display, with the regular polarizer shown in the left three images and the rotated polarizer shown in the right three images. Again, these displays show marginal differences in the shape or contour of the CR plots, and approximately the same viewing on the lope with the rotated polarizers.

As discussed above, these exemplary displays represent only a few of numerous possible AMLCDs that can be used in connection with the present invention.

Figure 13:
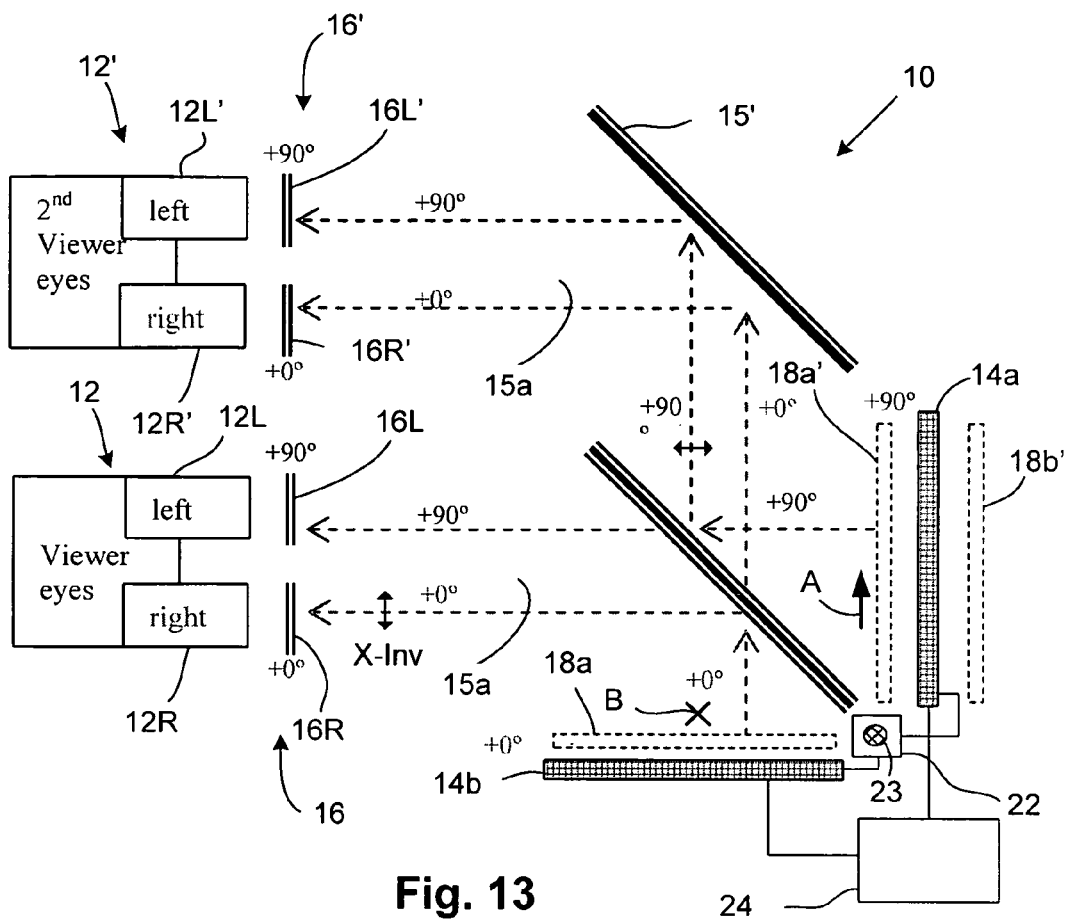
FIG. 13 is a schematic illustration of a three-dimensional display system for viewing by multiple viewers in accordance with another exemplary embodiment of the invention.
Figure 14:
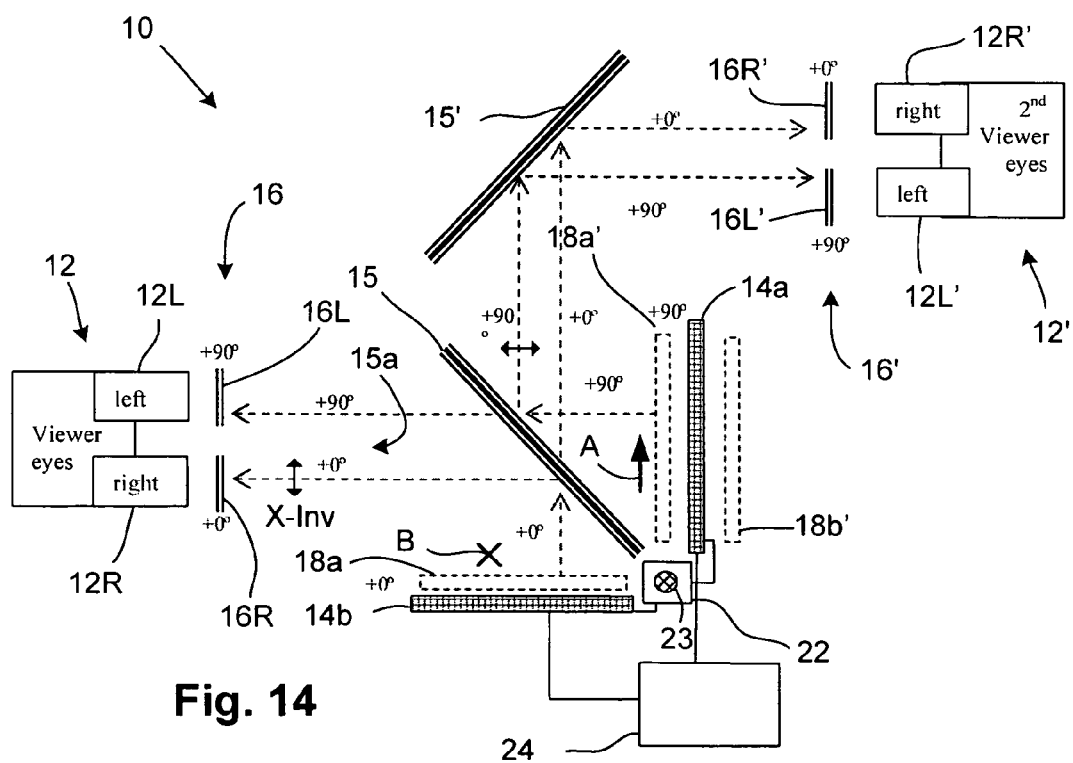
FIG. 14 is a schematic illustration of a three-dimensional display system for viewing by multiple viewers in accordance with another exemplary embodiment of the invention.

Turning now to FIGS. 13 and 14, the above exemplary embodiments have been described with respect to providing a stereoscopic image for a single viewer in a single position (with potentially varying viewing angles) relative to the display (or multiple viewers that are close enough to each other to view the images along the light path 15a in FIG. 1). It is to be appreciated that the display system, which is described and illustrated in connection with FIG. 1, can be converted or otherwise modified to facilitate viewing by one or more additional viewers. For example, FIG. 13 is a schematic illustration of a three-dimensional display system 10 for viewing by multiple viewers 12, 12'. It is to be appreciated that the display system described and illustrated in FIG. 1 can be converted to facilitate viewing by one or more additional viewers. FIG. 13 shows a side-by-side embodiment with multiple viewers 12, 12' facing the same direction, while FIG. 14 shows viewers 12, 12' facing opposite directions. In both of these exemplary embodiments, the display system 10 includes all of the components discussed with respect to FIG. 1. In addition, the exemplary embodiments of FIG. 13 and FIG. 14 include an additional front coated mirror 15' for reflecting or otherwise directing images from the beam combiner 15 to an additional viewer. It is to be appreciated that the images reflected by the mirror 15' will maintain their different relative polarization characteristics, such that the additional viewer or viewers can use polarizers to discriminate between the pair of stereo images.

With respect to the embodiment illustrated in FIG. 13, the display system 10 includes a mirror 15' that is generally parallel to and offset from the beam combiner 15, as shown. In this exemplary embodiment, images from the display 14a will be reflected by the beam combiner 15 to the mirror 15', which will reflect the respective image to the second viewer 12'. In addition, the image from the display 14b will be transmitted by the beam combiner 15 to the mirror 15', which reflects the image to the second viewer 12'

The exemplary device illustrated in FIG. 14 operates in a similar manner to the device illustrated in FIG. 13, except that the mirror 15' is generally perpendicular to and offset from the beam combiner 15, as is shown.

While the exemplary embodiments of FIGS. 13 and 14 are shown with respect to two viewers, it is to be appreciated that additional viewers may be accommodated by appropriately modifying the display system.

Although the invention has been shown and described with respect to several embodiments, equivalent alterations and modifications will occur to others skilled in the art upon reading and understanding this specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function of the described integer (i.e., that is functionally equivalent), even though not structurally equivalent to the disclosed structure which performs the function in the illustrated exemplary embodiment or embodiments of the invention. In addition, while a particular feature of the invention may have been described above with respect to only one of several illustrated embodiments, such feature may be combined with one or more other features of the other embodiments, as may be desired and advantageous for any given or particular application.

It will be appreciated that portions of the present invention can be implemented in hardware, software, firmware, or a combination thereof. In the described embodiment(s), a number of the steps or methods may be implemented in software or firmware that is stored in a memory and that is executed by a suitable instruction execution system. If implemented in hardware, for example, as in an alternative embodiment, implementation may be with any or a combination of the following technologies, which are all well known in the art: discrete logic circuit(s) having logic gates for implementing logic functions upon data signals, application specific integrated circuit(s) (ASIC) having appropriate combinational logic gates, programmable gate array(s) (PGA), field programmable gate array(s) (FPGA), etc.

Any process or method descriptions or blocks in flow charts may be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

The above description and accompanying drawings depict the various features of the invention. It will be appreciated that the appropriate computer code could be prepared by a person who has ordinary skill in the art to carry out the various steps and procedures described above and illustrated in the drawings. It also will be appreciated that the various terminals, computers, servers, networks and the like described above may be virtually any type and that the computer code may be prepared to carry out the invention using such apparatus in accordance with the disclosure hereof.

INDUSTRIAL APPLICATION

The present invention may be used to provide stereoscopic (three-dimensional) images for viewing and/or for other use.

What is claimed is:

1. A display system, comprising:
    a pair of wide viewing angle active matrix liquid crystal displays arranged at an angle to each other, each display providing respective images formed by plane polarized light, wherein both displays have horizontal and vertical viewing angles of at least 160 degrees;
    a beam combiner located between the displays such that the beam combiner transmits light from one display and reflects light from the other display, whereby the transmitted and reflected light are provided via the beam combiner in substantially the same direction; and
    wherein one of the wide viewing angle displays has a substantially vertical polarization and the other of the wide viewing angle displays has a substantially horizontal polarization.

2. The display system of claim 1, wherein the displays are substantially identical and each display has associated therewith a pair of polarizers and an optically active material therebetween, the optically active material being operable to change or not to change the polarization direction of light transmitted therein.

3. The display system of claim 2, wherein the polarizers of one display are rotated by 90 degrees relative to the corresponding polarizers of the other display.

4. The display system of claim 2, wherein the polarizers of one display are in a 90 degrees relation to the corresponding polarizers of the other display.

5. The display system of claim 2, wherein the polarizers are plane polarizers.

6. The display system of claim 3, wherein the displays have the same width-to-height aspect ratio.

7. The display system of claim 6, wherein polarizers are used to separate images from the displays for right and left eye viewing.

8. The display system of claim 7, wherein the polarizers are polarized lenses in eyeglass frames.

9. The display system of claim 3, wherein the displays have the same width and the displays have the same height, and as viewed via the beam combiner the respective widths and the respective heights are substantially congruent.

10. The display system of claim 1, wherein each display has a viewing angle of at least 170 degrees.

11. The display system of claim 1, wherein each display is a multi-domain vertical alignment (MVA) LCD.

12. The display system of claim 1, wherein each display is an axial symmetric vertical-alignment (ASV) LCD.

13. The display system of claim 1, wherein each display maintains a contrast ratio of at least 10:1 over a viewing angle of at least 80 degrees in the vertical direction off a normal viewing direction.

14. The display system of claim 13, wherein each display maintains a contrast ratio of at least 10:1 over a viewing angle of at least 80 degrees in the horizontal direction off a normal viewing angle.

15. The display system of claim 1, wherein one of the displays maintains a contrast ratio of at least 10:1 over a viewing angle of at least 80 degrees in the vertical direction off a normal viewing angle.

16. The display system of claim 15, wherein one of the displays maintains a contrast ratio of at least 10:1 over a viewing angle of at least 80 degrees in the horizontal direction off a normal viewing angle.

17. The display system of claim 16, wherein the other display maintains a contrast ratio of at least 10:1 over a viewing angle of at least 80 degrees in the vertical direction off a normal viewing angle.

18. The display system of claim 17, wherein the other display maintains a contrast ratio of at least 10:1 over a viewing angle of at least 80 degrees in the horizontal direction off a normal viewing angle.

19. The display system of claim 1, wherein the beam combiner combines images from both displays to provide viewable overlapping images that respectively have crossed polarization.

20. The display system of claim 1, wherein the displays are disposed at an angle of about 90 degrees to about 120 degrees relative to one another.

21. The display system of claim 1, wherein the displays are disposed at an angle of about 60 degrees to about 140 degrees.

22. The display system of claim 1, wherein the displays are disposed approximately orthogonal to one another.

23. The display system of claim 1, wherein the beam combiner is positioned relative to the two displays at approximately the bisectrix of the angle between the displays.

24. The display system of claim 1, wherein the displays are generally planar and are positioned relative to each other such that the planar extents thereof intersect along a linear axis and the beam combiner is generally planar and the planar extent thereof is parallel to such linear axis.

25. The display system of claim 1, further comprising a mount to position the displays in planes at an angle of about 60 degrees to about 140 degrees relative to each other.

26. The display system of claim 25, wherein the mount includes a mount for the beam combiner.

27. The display system of claim 1, further comprising a package for containing the displays and the beam combiner.

28. The display system of claim 27, wherein the package includes cover portions coupled by a hinge and movable to contain in protected relation the displays and beam combiner, and operable to provide access to and use of the displays and beam combiner.

29. The display system of claim 1, further comprising a data processing system for obtaining and organizing image data and presenting the image data for display.

30. The display system of claim 29, the data processing system including a processor, memory and connections to the respective displays.

31. The display system of claim 30, further comprising operating software to invert data for presentation to one of the displays for displaying the data in inverted relation to the data displayed by the other display.

32. The display system of claim 31, wherein the data processing system includes brightness compensation means.

33. The display system of claim 32, wherein the brightness compensation means compensate for brightness variations in the vertically polarized image.

34. The display system of claim 32, wherein the brightness compensation means compensates for brightness variations in the vertically polarized image viewed from an average viewing angle.

35. The display system of claim 1, wherein the beam combiner is a 50/50 beam splitter.

36. The display system of claim 1, wherein the beam combiner includes multi-layer thin depositions.

37. The display system of claim 1, wherein the beam combiner is a polarizing beam splitter.

38. The display system of claim 1, wherein the beam combiner preferentially transmits light having a polarization along a first direction and preferentially reflects light having a polarization along a second direction that is orthogonal to the first direction.

39. The display system of claim 1, wherein the beam combiner transmits light having a polarization along a vertical direction and reflects light having a polarization along a horizontal direction.

40. The display system of claim 1, wherein each display has a resolution of greater than 1.5 mega-pixels.

41. The display system of claim 1, wherein the displays do not exhibit inversion of gray levels within a vertical viewing angle range of about 160 degrees.

42. The display system of claim 41, wherein the displays do not exhibit inversion of gray levels within a horizontal viewing angle range of about 160 degrees.

43. The display system of claim 1, wherein the displays maintain gray level separation within a vertical viewing angle range of about 160 degrees.

44. The display system of claim 43, wherein the displays maintain gray level separation within a horizontal viewing angle range of about 160 degrees.

45. The display system of claim 1, wherein both displays are rectangular with a shorter dimension and a longer dimension, the displays being oriented such that both displays have their shorter dimension or longer dimension oriented parallel to a common linear axis, one of the displays having a polarization direction parallel to the linear axis and the other of the displays having a polarization direction orthogonal to the linear axis.

46. A display system comprising:
  a pair of wide viewing angle displays arranged at an angle to each other, each display providing respective images formed by plane polarized light, wherein each display is an in-plane switching (IPS) liquid crystal display (LCD);
  a beam combiner located between the displays such that the beam combiner transmits light from one display and reflects light from the other display, whereby the transmitted and reflected light are provided via the beam combiner in substantially the same direction; and
  wherein one of the wide viewing angle displays has a substantially vertical polarization and the other of the wide viewing angle displays has a substantially horizontal polarization.

47. A display system comprising:
  a pair of wide viewing angle displays arranged at an angle to each other, each display providing respective images formed by plane polarized light, wherein each display has a horizontal viewing angle of at least 160 degrees;
  a beam combiner located between the displays such that the beam combiner transmits light from one display and reflects light from the other display, whereby the transmitted and reflected light are provided via the beam combiner in substantially the same direction; and
  wherein one of the wide viewing angle displays has a substantially vertical polarization and the other of the wide viewing angle displays has a substantially horizontal polarization, and both displays are rectangular with a shorter dimension and a longer dimension, the displays being oriented such that both displays have their shorter dimension or longer dimension oriented parallel to a common linear axis, one of the displays having a polarization direction parallel to the linear axis and the other of the displays having a polarization direction orthogonal to the linear axis.

48. The display system of claim 47, wherein each display has a vertical viewing angle of at least 160 degrees.

49. A display system comprising:
  a pair of active matrix liquid crystal displays (AMLCDs) arranged at an angle to each other, the AMLCDs having the same relative orientation and producing images having orthogonal polarization, wherein both AMLCDs have horizontal and vertical viewing angles of at least 160 degrees; and
  a beam combiner disposed between the AMLCDs such that the beam combiner transmits light from one AMLCD and reflects light from the other AMLCD.

50. The display system of claim 49, wherein both AML-CDs maintain a contrast ratio of at least 10:1 over horizontal and vertical viewing angles of at least 160 degrees.

51. The display system of claim 49, wherein each AMLCD includes:
- a front polarizer and a rear polarizer, the front and rear polarizers having orthogonal polarizations; and
- a dual brightness enhancement film (DBEF), the DBEF matching the orientation of the rear polarizer.

52. The display system of claim 49, wherein both AML-CDs are rectangular with a shorter dimension and a longer dimension, the AMLCDs being oriented such that both AML-CDs have their shorter dimension or longer dimension oriented parallel to a common linear axis, one of the AMLCDs having a polarization direction parallel to the linear axis and the other of the AMLCDs having a polarization direction orthogonal to the linear axis.

53. A display system comprising:
- a pair of active matrix liquid crystal displays (AMLCDs) arranged at an angle to each other, the AMLCDs having the same relative orientation and producing images having orthogonal polarization, wherein each AMLCD has a horizontal viewing angle of at least 160 degrees; and
- a beam combiner disposed between the AMLCDs such that the beam combiner transmits light from one AMLCD and reflects light from the other AMLCD.

* * * * *